(12) United States Patent
Harris

(10) Patent No.: US 7,950,549 B1
(45) Date of Patent: May 31, 2011

(54) POWERED DISPENSER WITH INTERCHANGEABLE CARTRIDGES

(76) Inventor: Tami Lynn Harris, Sacramento, CA (US)

(*) Notice: Subject to any disclaimer, the term of this patent is extended or adjusted under 35 U.S.C. 154(b) by 770 days.

(21) Appl. No.: 12/002,960

(22) Filed: Dec. 19, 2007

(51) Int. Cl.
*B65D 88/54* (2006.01)

(52) U.S. Cl. ........................................ 222/333; 222/325

(58) Field of Classification Search .................. 222/333, 222/1, 63, 323–327, 390, 391
See application file for complete search history.

(56) References Cited

U.S. PATENT DOCUMENTS

| | | | |
|---|---|---|---|
| 2,102,939 A * | 12/1937 | Bishop | 222/326 |
| 2,115,591 A * | 4/1938 | Sherbondy | 222/327 |
| 3,208,638 A * | 9/1965 | Frenzel et al. | 222/39 |
| 4,258,864 A | 3/1981 | Karamanolis | |
| 4,869,403 A * | 9/1989 | Bruning | 222/327 |
| 5,137,184 A * | 8/1992 | Jackson et al. | 222/327 |
| 5,361,946 A * | 11/1994 | Ginther et al. | 222/175 |
| 5,405,050 A | 4/1995 | Walsh | |
| D393,574 S | 4/1998 | Perkins et al. | |
| 5,980,144 A | 11/1999 | DeBourg | |
| 6,026,985 A * | 2/2000 | Elliott, Sr. | 222/1 |
| 6,047,858 A | 4/2000 | Romer | |
| 6,101,968 A | 8/2000 | Fitzgibbons | |
| 6,152,333 A | 11/2000 | Binder | |
| 6,273,302 B1 * | 8/2001 | Fornaro | 222/333 |
| 6,460,481 B1 | 10/2002 | Young | |
| 6,460,731 B2 | 10/2002 | Estelle | |
| 6,968,873 B1 | 11/2005 | Cariddi | |
| 7,451,900 B2 * | 11/2008 | Hornsby et al. | 222/325 |
| 7,690,530 B2 * | 4/2010 | Schneider et al. | 222/63 |
| 2010/0001017 A1 * | 1/2010 | Herman et al. | 222/1 |

* cited by examiner

*Primary Examiner* — Lien T Ngo
(74) *Attorney, Agent, or Firm* — Dennis A. DeBoo

(57) ABSTRACT

An electric or battery powered hand tool, which dispenses a wide variety of semi-soft materials. It is held in one hand and dispenses the material by pressing a pressure sensitive flow-control button. The power of the motor is adjustable, depending upon the consistency of the product to be dispensed. The dispenser features a quick-change cartridge system, which allows the user to quickly and easily change cartridges, which are pre-filled with the material of the user's choice, without having to clean out the barrel. The dispenser can be used in many applications such as cake decorating, craft applications, woodworking and construction.

18 Claims, 7 Drawing Sheets

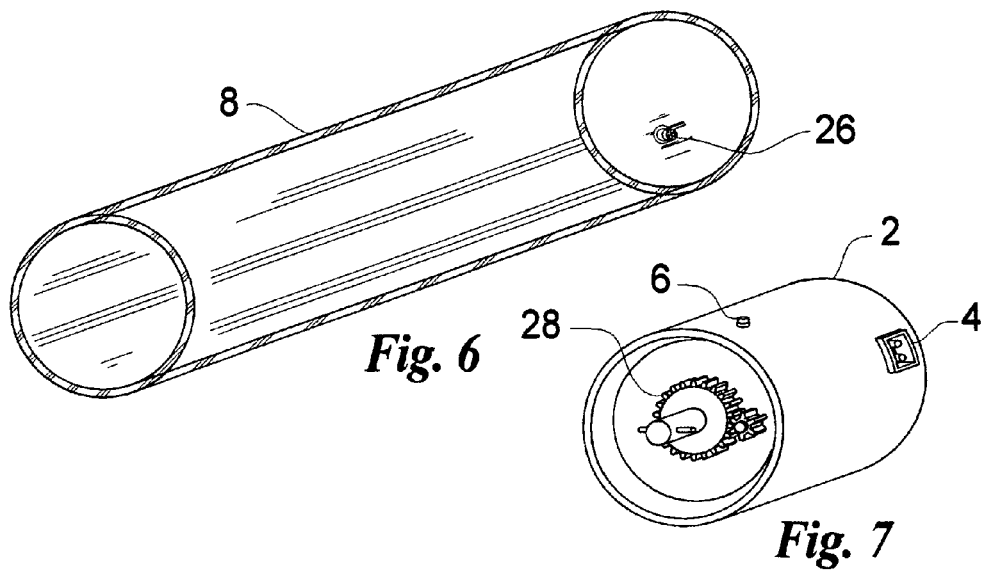
*Fig. 6*
*Fig. 7*
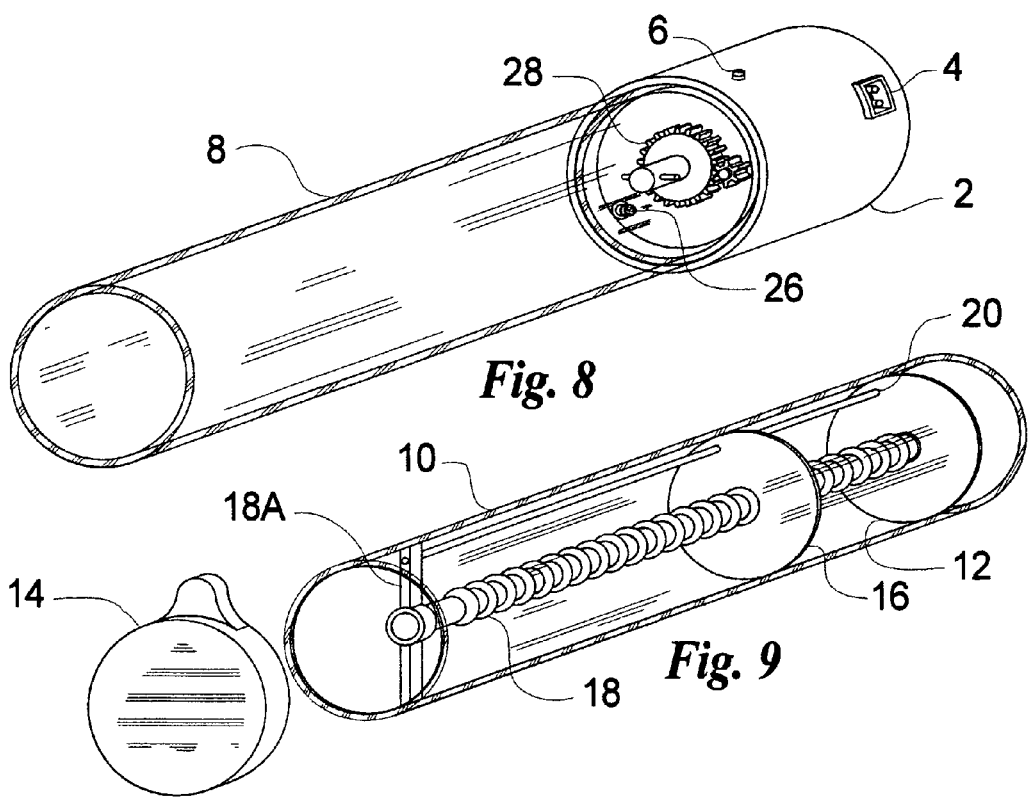
*Fig. 8*
*Fig. 9*

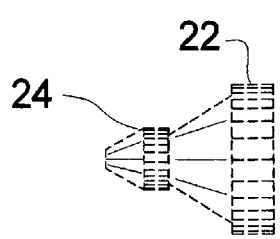
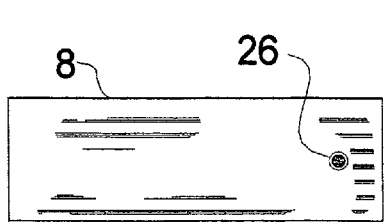
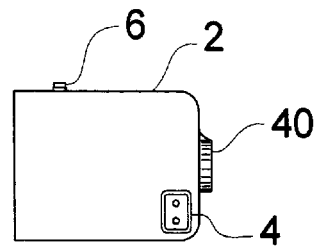
*Fig. 13*    *Fig. 14*    *Fig. 15*
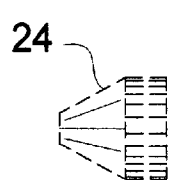
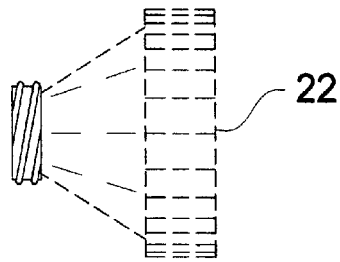
*Fig. 16*    *Fig. 17*
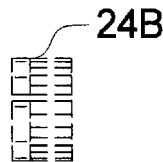
*Fig. 18*
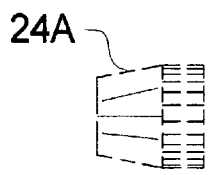
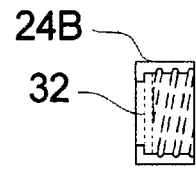
*Fig. 19*    *Fig. 20*    *Fig. 21*    *Fig. 22*

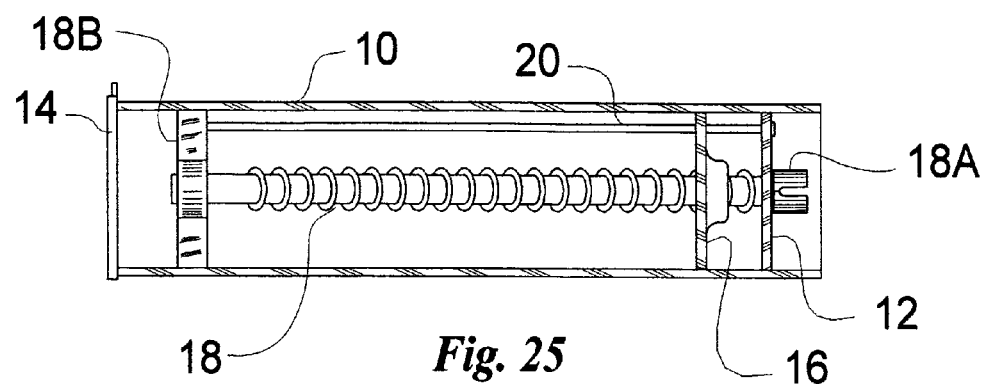
*Fig. 25*
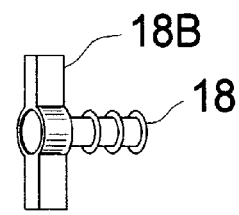
*Fig. 26*
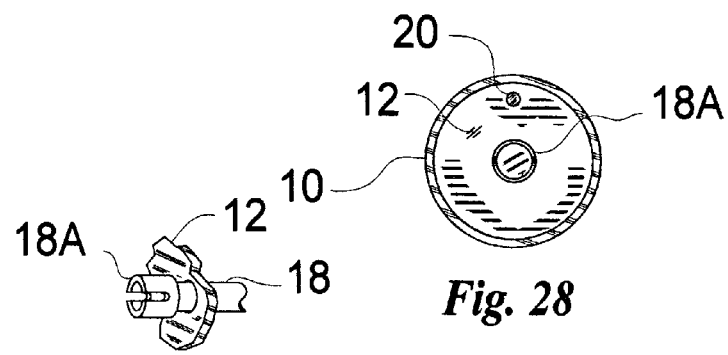
*Fig. 27*
*Fig. 28*
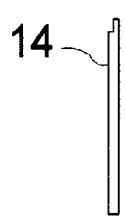
*Fig. 29*
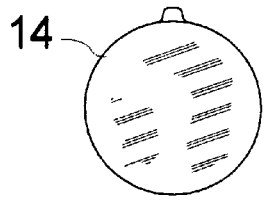
*Fig. 30*
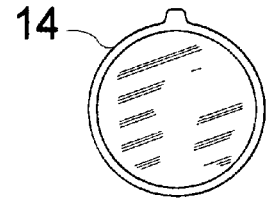
*Fig. 31*

POWERED DISPENSER WITH INTERCHANGEABLE CARTRIDGES

FIELD OF THE INVENTION

The present invention relates to an electric or battery powered hand tool, which dispenses a wide variety of semi-soft materials. It is held in one hand and dispenses the material by pressing a pressure sensitive flow-control button. The power of the motor is adjustable, depending upon the consistency of the product to be dispensed.

The dispenser features a quick-change cartridge system, which allows the user to quickly and easily change cartridges, which are pre-filled with the material of the user's choice, without having to clean out the barrel.

The powered dispenser can be used for a number of applications, depending on the model and the material to be dispensed. For example the dispenser can be used in cake decorating with a model that dispenses frostings in a wide variety of colors, flavors, and consistencies, or construction/woodworking to dispense caulking and adhesives and in crafts to dispense a semi-soft, bake-able polymer clay compound in a wide variety of colors or many other applications.

In cake decorating, for example, a user will be able to change frosting colors or flavors, quickly and easily by replacing the frosting cartridge with a new color or flavor cartridge, eliminating the need to clean out the barrel with each color or flavor change. The cake decorator's model may also include a cookie press accessory, and a more powerful "Cookie Dough" setting on the motor control dial, which allows for a firmer consistency product, like cookie dough, to be dispensed.

The model of the tool will vary in size, construction materials, and motor strength, depending on the application. The Construction/Woodworker's model for example would be made of much more rugged and durable materials, for indoor and outdoor use, than the Crafter's model or the Cake Decorator's model, which are intended for indoor use only.

DESCRIPTION OF THE PRIOR ART

In the prior art U.S. Pat. No. 6,460,481 (Young) discloses a cake decorator that has an axial cylinder and a powered piston controlled by twisting an axial rotary actuator switch in one direction or another.

U.S. Pat. No. 6,047,858 (Romer) discloses a device for applying frosting or icing to a cake or pastry from a cartridge containing pastry dough, frosting or icing. The device has a walled cartridge container and a hand-held gun for dispensing pastry dough, icing or frosting. The device consists of a tube defining side walls of a compressed air chamber, a cap is arranged to seal an end of the tube and define a top of the compresses air chamber. A plunger rod is disposed within the tube. A sealing washer is connected to the rod to provide an air seal with an inside surface of the tube, the sealing washer defining a lower wall of compressed air chamber. Inlet in the cap or tube located to allow air into compressed air chamber. Valve structure associated with air inlet for controlling the air pressure in the compressed air chamber. A container lid connected to a lower portion of the tube the plunger rod extending through the lid. A container body having an opening that seals with container lid and a container outlet in a portion opposite the opening. A hand held gun having a gun valve for dispensing pastry dough, icing or frosting. A hose connecting the container outlet to the gun. A finger trigger of the hand-held gun connected to gun valve whereby when pastry dough, frosting or icing is in the container body the finger trigger is activated, the gun valves open allowing the flow of pastry, dough or icing.

U.S. Pat. No. 6,101,968 (INNOVATIVE INJECTORS) discloses a motor and gear train driven by the motor, the train adapted to selectively engage a gear rack secured to the compression element to drive it down to squeeze the collapsible frosting container. When the train has moved into engagement, it closes a switch activating the motor.

U.S. Pat. No. 6,152,333 (Binder) discloses an apparatus for extrusion and metered delivery of free-flowing substances, having a housing having a receiving space, openable at least on one side, for a disposable material package having an expulsion nozzle with a compressed-air connection and having, on the side opposite the expulsion nozzle, a piston that is displaceable in the direction of the expulsion nozzle in the receiving space or in the disposable material package, and pushes the substance ahead of it and thereby ejects it from the expulsion nozzle, compressed air being fed from the compressed-air connection to the side of the piston facing away from the expulsion nozzle.

U.S. Pat. No. 6,026,985 (Elliott) discloses a food dispenser gun, comprising a tube holding a quantity of an extrudable food product, a piston sealingly engaged with an interior of the tube, a rod coupled to the piston and an incremental dispenser engaged with the rod and the tube, the incremental dispenser comprising a trigger, or an advancement lever operable to move the rod in a first direction relative to the incremental dispenser in response to the trigger and a retrograde lock operable to prevent the rod from moving in a second direction, wherein the advancement lever and the retrograde lock are completely enclosed by a housing of the incremental dispenser.

U.S. Pat. No. 5,405,050 (Walsh) discloses an apparatus for dispensing viscous fluids, such as adhesives, sealants, caulks is actuated by an electromagnetic coil assembly in conjunction with a magnet mounted to a plunger. Energizing the coil assembly produces an electromagnetic field which cooperates with the magnetic field to cause the plunger to open. Closing results from reversing the electromagnetic field.

U.S. Pat. No. 4,258,864 (KARAMANOLIS) discloses an automatic toothpaste dispenser employs a roller-type squeeze device that is driven along the toothpaste tube simultaneously with the opening of a gate that permits the toothpaste to flow. After the desired amount of toothpaste has been dispensed, the roller is automatically retracted and the gate is simultaneously closed. However, the retraction of the gate only continues until the gate is closed, which results in a ratchet-like effect, the roller being retracted a smaller distance than that by which it is advanced.

U.S. Pat. No. 5,980,144 (DEBOURG) discloses a hand held dispenser for thermoplastic material including a casing forming a manual holding element and enclosing a space for receiving a mass of thermoplastic material in a solid state, the casing having an open outlet end communicating with the space; a component for advancing the thermoplastic material toward the open end of the casing, and a heating element for heating the thermoplastic material to a flowable state, wherein the heating element has a low thermal inertia, is arranged in a substantially homogeneous manner across a surface disposed opposite the open end and having dimensions which correspond to dimensions of the open end and wherein the heating element further acts to distribute thermoplastic material in a flowable state in the form of a sheet on a receiving surface.

U.S. Pat. No. 6,460,731 (ESTELLE) discloses an electrically operated fluid dispenser for dispensing a pattern of viscous fluid onto a substrate during a run mode. The dispenser is turned off and does not dispense the viscous fluid during a standby mode of operation. The dispenser includes a dispenser body having an outlet and an armature disposed in the dispenser body for movement between an opened position allowing a fluid flow from the outlet and a closed position preventing the fluid flow from the outlet. A coil is mounted adjacent the armature and selectively generates an electromagnetic field for moving the armature between the opened and closed positions. A controller includes different apparatus and methods for using the coil as a heater as well as providing other heat transfer devices on the dispensing valve to maintain a constant temperature either, during only the run mode or, during both, the run and the standby modes.

U.S. Pat. No. 6,968,873 (CARIDDI) shows a bagel or pastry filling device attachable to one end of a standard and well-known pastry filling or cake decorating gun. The inventive concept combines a bent piece of tubing made from any suitable material wherein one end has a sharp edge which is insertable into a bagel, donut, piece of pastry, and whose other end is inserted into a funnel where it is held in place by means of an insert placed inside the flared opening of the funnel which, while usually made of plastic, may be made of any suitable material. The pastry filling attachment is then inserted into a nut, usually made of plastic, which in turn engages a length of plastic tubing having external male threads.

USD 393,574 (Perkins) shows a pastry extruder. The extruder uses a manually operated trigger to move the plunger inside the barrel of the dispenser. The dispensable material is contained inside the barrel of the dispenser. If the user wants to change dispensable materials they must clean out the barrel before reloading with the new material.

SUMMARY OF THE INVENTION

The powered dispenser of the present invention consists of a rigid plastic tube (the barrel), with an interchangeable tip coupler on one end, and a variable speed electric motor on the other end. The couplers are interchangeable and are held in place by a threaded ring (coupler ring), which is removed to change the coupler, and to load the cartridges into the barrel.

A pre-filled cartridge, containing the material to be dispensed, is loaded into the barrel by removing the coupler ring, allowing access to the opening in the barrel. The cartridge is inserted into the barrel and pushed onto the motor in the base to secure. The appropriate coupler is inserted into the coupler ring and screwed back on to the open end of the barrel.

The couplers, available in a variety of sizes, also have a threaded ring (the tip ring), which secures the desired dispensing/decorating tip of the user's choice. A large coupler is mounted to hold larger tips, and a smaller coupler to hold standard sized tips. The user can easily change the dispensing/decorating tip according to their need, by unscrewing the tip ring and inserting a new tip.

A rubber gasket, resting inside a groove in the coupler ring, secures the open end of the cartridge to prevent leakage into the barrel.

A pressure sensitive flow-control button, located near the tip end of the barrel, is attached to the variable speed motor. The motor's speed, power, and direction (clockwise and counterclockwise) are controlled by a dial located at the end of the barrel's motor housing. The motor control dial allows the user to change the motor speed and power according to the consistency of the product to be dispensed and the desired flow of the material. The motor also has a forward and reverse (clockwise and counter-clockwise) setting.

The barrel is held in one hand (as if it were a pencil). A variation of the design would use a rechargeable lithium-ion battery housed in a pistol grip, located at the tip end of the barrel. On this design the flow-control button would be a trigger-type button located on the pistol grip.

The pressure sensitive flow-control button (or trigger) is pressed to activate the variable speed motor in the base. The motor drives a rubber-ringed plunger down a threaded rod, through the cartridge, pushing the material to be dispensed out through the tip.

Depending on the model used, the cartridges can be purchased pre-filled with a wide variety of semi-soft products such as cake frosting, caulking, adhesives, semi-soft polymer clay, etc.

The cartridges are reusable and/or disposable, and come with a removable seal to keep the product from drying out. The cartridge is a rigid plastic tube, open on one end (the dispensing end) and sealed by an end-cap on the other end (the cartridge base). A hole in the end cap allows a threaded screw, which runs the length of the cartridge, to turn freely. The threaded screw is mounted onto a gear at the cartridge base. The gear is fitted with a female coupler, which is seated into the male motor connection.

Empty cartridges may also be purchased so that the user may fill them with their own frosting recipe, or for polymer clay artists who want to mix their own colors. To fill (or refill) an empty cartridge the cartridge is inserted into the barrel and the power is reversed to drive the plunger back toward the motor end of the cartridge. Once the plunger is in position at the base of the cartridge (the motor end) the cartridge may be removed and filled with a custom mixture of the user's choice.

The plunger is threaded and mounted onto the threaded rod in the cartridge. As the motor turns the threaded rod, the plunger is driven up (or down) the rod towards the tip end of the barrel. A guide rod, molded into the interior of the cartridge, provides a guide for the plunger to prevent the plunger from turning freely inside the cartridge. The guide rod forces the plunger up or down the threaded rod, depending on the direction of the motor. A notch cut into the edge of the rubber ring on the plunger, fits the guide rod securely and allows the plunger to slide on the guide rod as it travels up and down the threaded rod, without loss of material through the notch in the rubber ring.

Once the cartridge is seated into the motorized base and the flow control button is activated, the motor drives the plunger up the threaded rod, pushing the semi-soft material through the cartridge and out through the interchangeable tip. The motor can be reversed to push the plunger back down the tube towards the base of the cartridge for refilling of the cartridge if desired. Once the cartridge is empty, a new or refilled cartridge is inserted into the barrel.

As stated above it is proposed to have a different powered dispenser. The dispenser can either be of a standard or pistol grip versions, both falling within the scope of the invention. Each dispenser dispenses a wide variety of dispensable materials, that is any semi-soft (frosting consistency) material. The dispenser uses re-sealable cartridges containing dispensable of the users choice, depending on the model/application. Cartridges are reusable (you can clean and refill empty cartridges) and recyclable. It is proposed to sell empty cartridges (cartridge blanks) such that they can be filled with a dispensable material of a user's choice.

The motor housing and wiring housing (for the button and trigger, and the reverse buttons) may contain an access panel for servicing motor and wiring. The dispenser is made of durable, ridged hard plastic.

It may be preferable for the barrel of the dispenser to be completely transparent. An alternative to an all transparent barrel would be a transparent viewing window running the length of the barrel. The motor housing is permanently affixed to the barrel.

The cartridge gear at the base of the cartridge and the threaded plunger drive rod are affixed to each other so that when the motor turns the cartridge gear, the threaded plunger drive rod also turns at the same rate.

The rubber-ringed plunger is a plastic disk, which rides on a threaded carriage up and down the threaded plunger drive rod. The plastic disk may also have a rubber ring (gasket) around the edge to prevent leakage into the cartridge barrel. If so, the rubber ring has a notch to fit snugly against the molded guide rod to prevent leakage of the dispensable into the barrel of the cartridge.

The Molded Guide Rod inside the cartridge is plastic and is molded inside each cartridge. This rod prevents the cartridge plunger from turning in place, forcing the plunger up or down the cartridge, depending on the direction of the motor (clockwise or counter-clockwise).

An alternative design to eliminate the need for the molded guide rod and the notch in the plunger (and the notch in the rubber-ring on the plunger) would be to make the dispenser and cartridge barrel slightly oval shaped instead of round. The oval shape would serve the function of the guide rod in that it would force the plunger up (or down) the barrel of the cartridge. Without some method of forcing the plunger up or down the barrel, the plunger would simply turn in place and not travel up or down the threaded plunger drive rod.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A complete understanding of the present invention may be obtained by reference to the accompanying drawings, when considered in conjunction with the subsequent, detailed description, in which:

FIG. 6 shows an isometric view of the cylinder of the invention FIG. 7 shows an isometric view of the motor of the invention FIG. 8 shows an isometric view of cylinder and motor of the invention FIG. 9 shows an isometric view of the cartridge and end cap of the invention.

FIG. 13 shows a side view of the application tip of the invention FIG. 14 shows a side view of the cylinder of the invention FIG. 15 shows a side view of the motor of the invention FIG. 16 shows a side view of the application tip of the invention FIG. 17 shows a side view of the application tip retaining rim of the invention FIG. 18 shows a side view of the thread of the application tip retaining rim of the invention FIG. 19 shows a side view of a decorator tip acceptor of the invention FIG. 20 shows an inside view of the thread of the application tip retaining rim of the invention FIG. 21 shows a side view of a decorating tip of the invention FIG. 22 shows a front view of a decorating tip of the invention FIG. 25 shows a side view of a portable plastic cartridge of the invention FIG. 26 shows an isometric view of motor coupling/shaft end support of the invention FIG. 27 shows an isometric view of the motor coupling and top inside rim of the cylinder of the invention FIG. 28 shows a rear view of the cartridge of the invention FIG. 29 shows a top view of the end cap of the cartridge of the invention FIG. 30 shows a side view of the end cap of the cartridge of the invention FIG. 31 shows an inside view of the end cap of the cartridge of the invention For purposes of clarity and brevity, like elements and components will bear the same designations and numbering throughout the figures.

DETAILED DESCRIPTION

Figure 1:
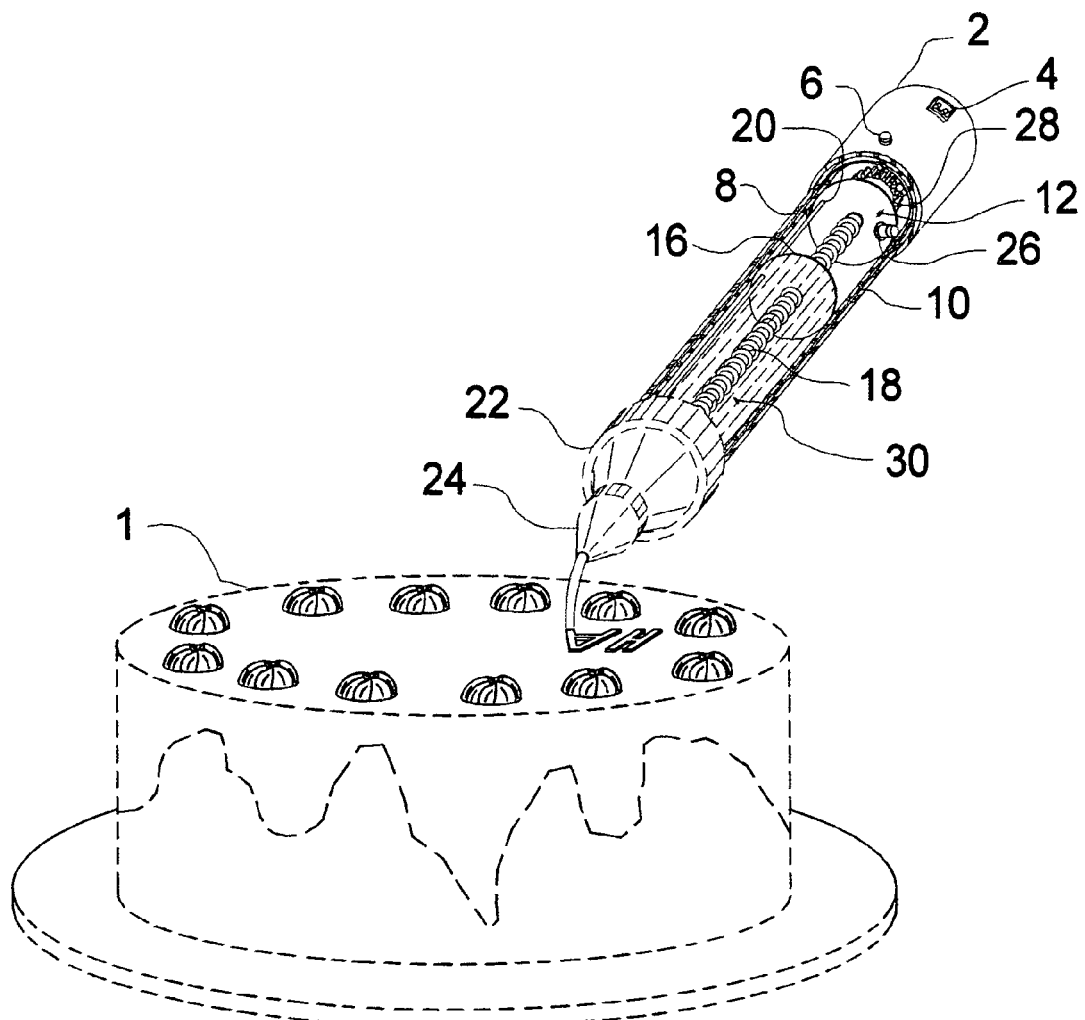
FIG. 1 shows an isometric view of the pencil grip embodiment of the invention used in a cake decorating application

FIG. 1 shows the pencil grip embodiment of the invention and how it is used in a cake decorating application. The cake is shown at 1. The powered dispenser is made up of several components. At one end is an application tip 24, for example in this instance for bakery items, attached to an application tip retaining rim 22. Attached to 22 is a cylinder 8, which is preferably made of plastics, and has within it a plunger disc 16 which is supported on a guide rod 20 as it travels up and down a screw shaft 18. The screw shaft 18 is driven by a motor 2 via reduction gearing 28. This motor may contain a rechargeable battery that is charged via receptacle 4. A reverse switch 6 is also provided to drive the motor in the opposite direction. Inside the cylinder 8 is placed a plastic cartridge 10 which can be can be filled with icing, glue, adhesive etc or any other semi-soft material for a particular application. The content of the cartridge is shown at 30. Also shown in this figure the top inside rim 12 of the cylinder 8 which prevents icing, glue, adhesive etc entering the gear area and a pressure relief valve 26 which lets air not icing, glue, adhesive etc out.

Figure 2:
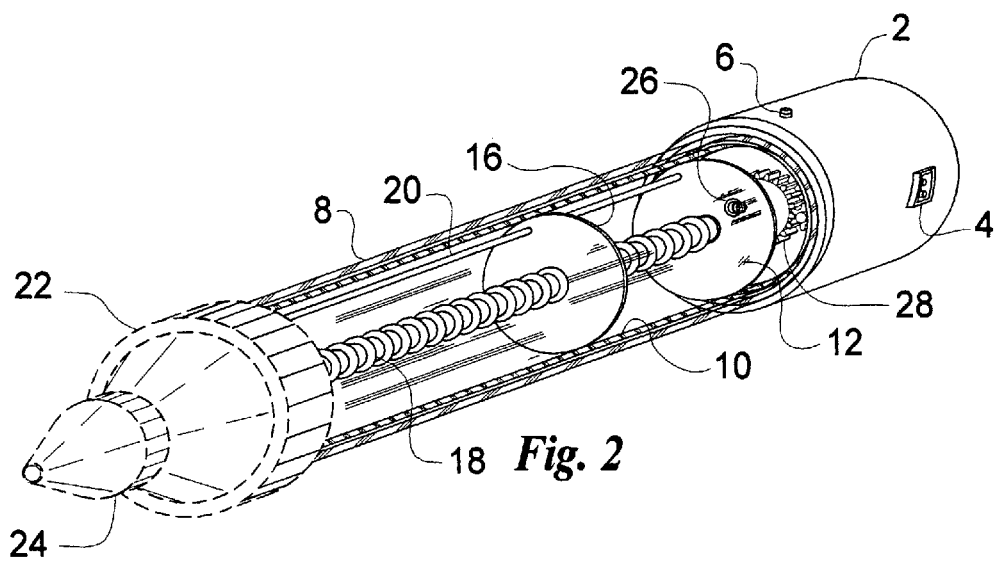
FIG. 2 shows an isometric view of the pencil grip embodiment of the invention

FIG. 2 shows a similar view as FIG. 1 but without the cake.

Figure 3:
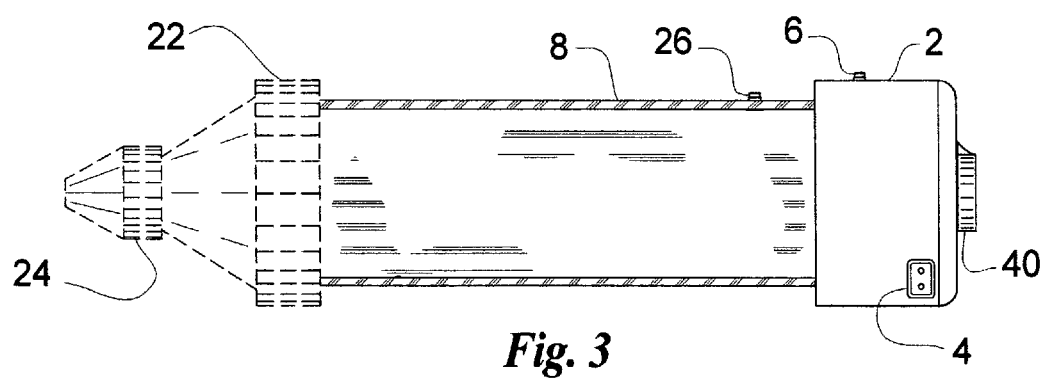
FIG. 3 shows a side view of the pencil grip embodiment of the invention

FIG. 3 shows a side view of the invention but also shows a motor control switch 40 which is used to turn the invention on and off and also vary the speed.

Figure 4:
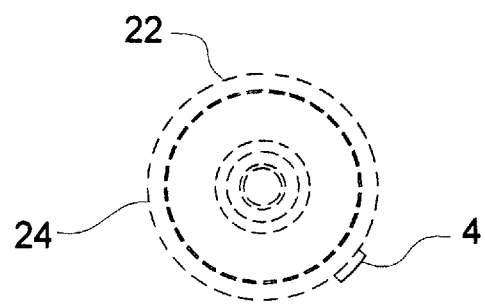
FIG. 4 shows a front view of the pencil grip embodiment of the invention

FIG. 4 shows a front view of the invention, with the application tip 24 and the application tip retaining rim 22. This view also shows the battery recharging receptacle 4 protruding.

Figure 5:
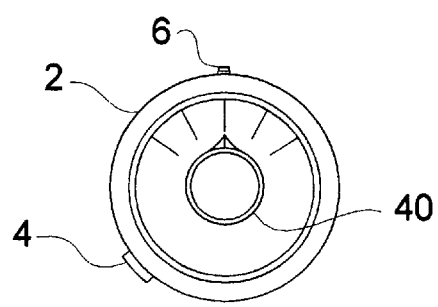
FIG. 5 shows a rear view of the pencil grip embodiment of the invention

FIG. 5 shows a rear view of the invention with the motor control switch 40 used to switch the invention on and off and also adjust the speed. The switch in situated on the motor 2. This figure also shows the battery recharging receptacle 4 protruding and the reverse switch 6 which is used to change the direction of the motor 2.

FIG. 6 shows an isometric view of the cylinder 8 which is preferably made of a plastics material. The cylinder has a pressure relief valve 26 at one end that lets air but does not allow the semi-soft material being dispensed by the invention out.

FIG. 7 shows an isometric view of the motor 2 having reverse switch 6 which is used to change the direction of the motor 2 and a battery recharging receptacle 4. The motor drives a screw shaft (shown in FIG. 1) via reduction gears 28.

FIG. 8 shows the cylinder shown in FIG. 6 and the motor shown in FIG. 2 together.

FIG. 9 shows an isometric view of the cartridge 10 and end cap 14 which is used to retain icing, glue or adhesive etc or other semi-soft material used for a particular application. The cartridge 10 is filled with icing, glue or adhesive etc or other semi-soft material used for a particular application. A screw shaft 18 passes through the centre of the cartridge 10 having at one end a motor coupling 18A and a top inside rim 12 preventing icing, adhesives, glues etc from entering the gear area of the motor. A plunger disc 16 moves along the cartridge 10 and is secured on a guide rod 20 as it travels up and down.

Figure 10:
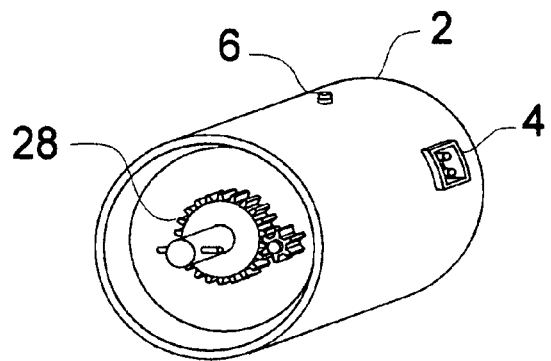
FIG. 10 shows an isometric view of the front of the motor of the invention

FIG. 10 shows an isometric view of the motor 2 having reverse switch 6 which is used to change the direction of the motor 2 and a battery recharging receptacle 4. The motor drives a screw shaft (shown in FIG. 1) via reduction gears 28.

Figure 11:
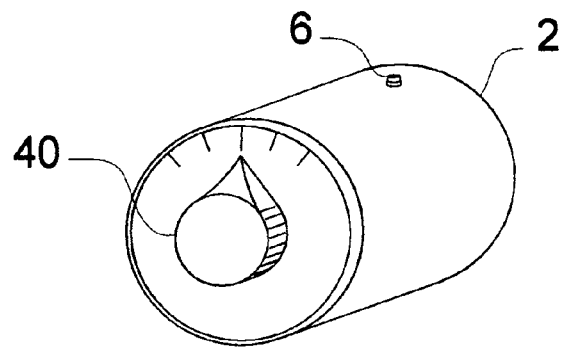
FIG. 11 shows an isometric view of the rear of the motor of the invention

FIG. 11 shows the motor control switch 40 used to switch the invention on and off and also adjust the speed. The switch in situated on the motor 2. This figure also shows the reverse switch 6 which is used to change the direction of the motor 2.

Figure 12:
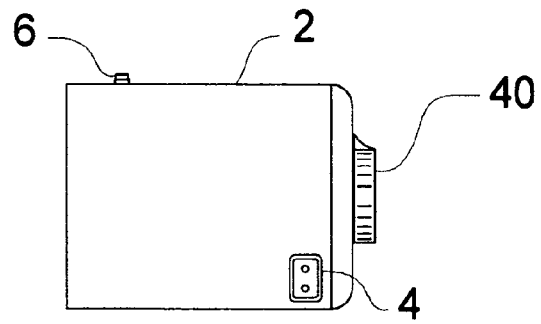
FIG. 12 shows a side view of the motor of the invention and the motor control switch

FIG. 12 shows a side view of the invention with the motor control switch 40 used to switch the invention on and off and also adjust the speed. The switch in situated on the motor 2. This figure also shows the battery recharging receptacle 4 protruding and the reverse switch 6 which is used to change the direction of the motor 2.

FIGS. 13,14 and 15 show a side view of the application tip 22/24, the cylinder 8 and the motor 2 also which have been described previously.

FIGS. 16 and 17 show a side view of the application tip 24 and the application tip retaining rim 22 which are shown separated and are connected by a screw-type thread. FIG. 18 shows a side view of the thread of the application tip retaining rim 22.

FIG. 19 shows a side view of a decorator tip acceptor 24A, FIG. 20 shows an inside view of the thread 24 of the application tip retaining rim with the decorating tip (for a bakery application) 32. FIG. 21 shows a side view of a decorating tip 32 and FIG. 22 shows a front view of a decorating tip 32.

Figure 23:
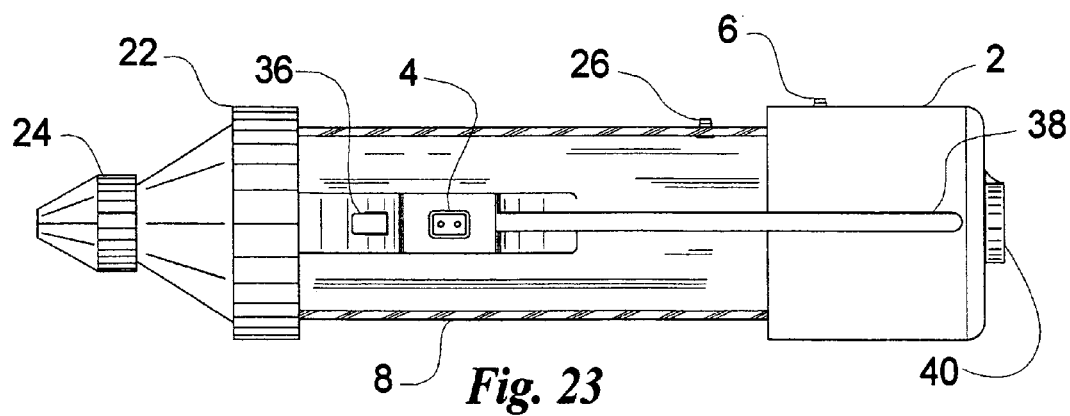
FIG. 23 shows a bottom view of the invention

FIG. 23 shows a bottom view of the invention with application tip 24, application tip retaining rim 22, cylinder 8, a battery recharging receptacle 4, pressure relief valve 26, reverse switch 6, motor 2, wire housing 38 and the motor control switch 40.

Figure 24:
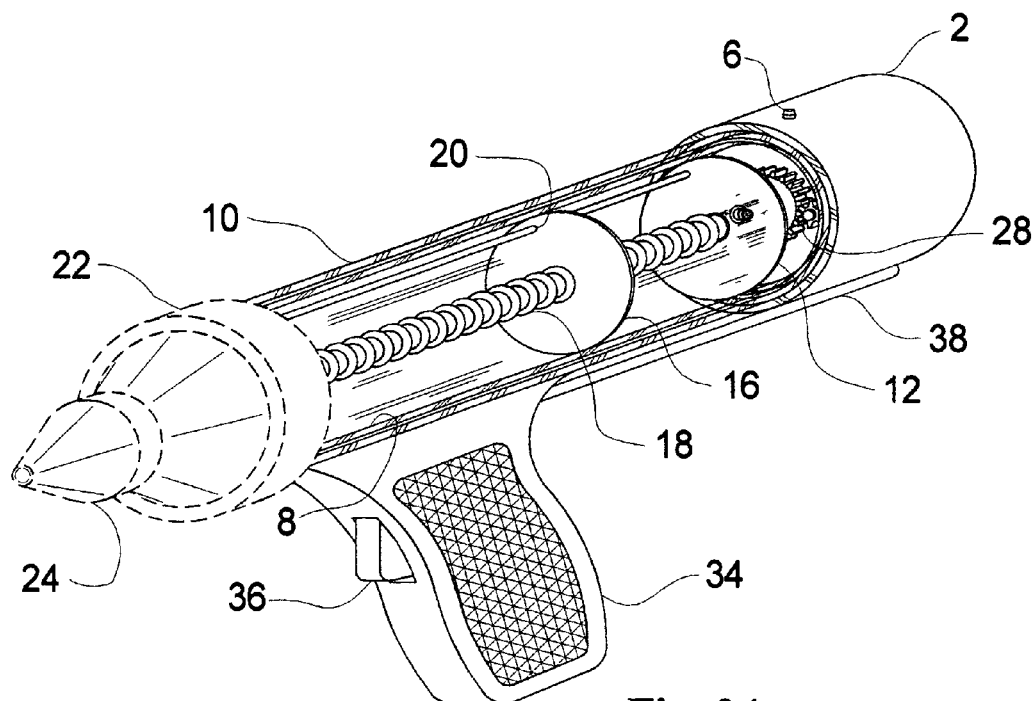
FIG. 24 shows an isometric view of the trigger grip embodiment of the invention

FIG. 24 shows an isometric view of the trigger grip embodiment of the invention, an alternative to the pencil grip embodiment shown in FIG. 1. This embodiment has a trigger grip handle 34 and a trigger switch 36. The rest of this embodiment is the same as the embodiment shown in FIG. 1 with the same reference numerals.

FIG. 25 shows a side view of a plastic cartridge 10 as shown in FIG. 9.

FIG. 26 shows an isometric view of the shaft end support 18B that is situated at a distal end of the screw shaft 18.

FIG. 27 shows an isometric view of the motor coupling 18A and top inside rim of the cylinder 12 and screw shaft 18.

FIG. 28 shows a rear view of the cartridge 10, with the top inside rim 12, guide rod 20 and motor coupling 18A.

FIGS. 29, 30 and 31 show view of the end cap of the cartridge which is used for retaining icing, glue, adhesive etc or other semi-soft material used in the inventions application.

It will be apparent to those skilled in the art that various modifications and variations can be made to the structure of the present invention without departing from the scope or the spirit of the invention. In view of the foregoing, it is intended that the present invention cover modifications and variations of this invention provided they fall within the scope of the following claims and their equivalents.

What is claimed is:

1. A powered dispenser, which dispenses a wide variety of semi-soft materials through interchangeable dispensing tips, that comprises a barrel with an interchangeable tip coupler on one end and a variable speed motor at the other end, the motor having adjustable power settings and a pressure sensitive flow-control button, the powered dispenser also comprises a replaceable cartridge which contains a semi-soft material to be dispensed wherein the replaceable cartridge is self-contained, comprising a plunger, inside the cartridge, which is moved up or down through the cartridge depending on the direction of the motor, the plunger is mounted on a threaded rod connected to the motor, which runs the length of the cartridge, and wherein a guide rod is provided inside the cartridge which provides a guide for the plunger to prevent the plunger from turning freely inside the cartridge.

2. A powered dispenser as claimed in claim 1 wherein the power of the motor can be adjusted according to the viscosity of the semi-soft material held in the replaceable cartridge via the pressure sensitive flow-control button, a higher powered setting for high viscosity materials, or a lower power setting to extrude lower viscosity materials.

3. A powered dispenser as claimed in claim 1 wherein the threaded rod is permanently affixed to a female gear, which, when inserted into the dispenser, engages with a male motor pin to turn the threaded rod inside the cartridge, the threaded rod forces the plunger up or down the cartridge, pushing the semi-soft material out through the dispensing tip.

4. A powered dispenser as claimed in claim 1 wherein the powered dispenser comprises a pistol grip.

5. A powered dispenser as claimed in claim 1 wherein the replaceable cartridge comprises a removable seal to keep the semi-soft material within it from drying out.

6. A powered dispenser as claimed in claim 1 wherein reduction gearing is provided between the threaded rod and the motor.

7. A powered dispenser as claimed in claim 1 wherein the dispenser is battery powered.

8. A powered dispenser as claimed in claim 1 wherein the dispenser is powered by electric.

9. A powered dispenser as claimed in claim 1 wherein the interchangeable tip coupler is held onto the barrel by a coupler ring which is removed to load a replaceable cartridge into the barrel.

10. A powered dispenser as claimed in claim 9 wherein a rubber gasket is placed inside the coupler ring to prevent leakage into the barrel of the semi-soft material held within it.

11. A powered dispenser as claimed in claim 1 wherein a dial is located at the end of the motor which allows a user to change the motor speed and power and also set it in forward or reverse.

12. A powered dispenser as claimed in claim 7 wherein a rechargeable socket is provided to charge the battery.

13. A powered dispenser for dispensing semi-soft materials, said powered dispenser comprising:
   a barrel with an interchangeable tip coupler on one end and a motor at the other end;
   a replaceable cartridge sized to be received within said barrel and to contain a semi-soft material to be dispensed;
   a threaded rod disposed inside said replaceable cartridge and connected to said motor;
   a plunger disposed inside said replaceable cartridge and mounted on said threaded rod wherein said plunger is driven along said threaded rod in an up or down direction through said replaceable cartridge depending on a direction that said motor turns said threaded rod; and
   means for preventing said plunger from turning freely inside said replaceable cartridge.

14. The powered dispenser of claim 13 further including an interchangeable dispensing tip secured to said interchangeable tip coupler.

15. The powered dispenser of claim 14 further including a female gear permanently affixed to said threaded rod wherein said female gear engages with a male motor pin to turn said threaded rod inside said replaceable cartridge wherein said threaded rod forces said plunger up or down said replaceable cartridge to push the semi-soft material out through said interchangeable dispensing tip.

16. The powered dispenser of claim 13 wherein said motor is a variable speed motor having adjustable power settings and a pressure sensitive flow-control button.

17. The powered dispenser of claim 13 wherein said dispenser is battery powered.

18. The powered dispenser of claim 13 wherein said powered dispenser comprises a pistol grip.

* * * * *